United States Patent [19]

Hosoya et al.

[11] Patent Number: 5,026,805

[45] Date of Patent: Jun. 25, 1991

[54] LOW-HYGROSCOPIC COPOLYMER

[75] Inventors: Kazuhiro Hosoya, Tokyo; Ikuji Ohtani, Yokohama; Kimio Imaizumi, Kiyose, all of Japan

[73] Assignee: Asahi Kasei Kogyo Kabushiki Kaisha, Osaka, Japan

[21] Appl. No.: 444,438

[22] Filed: Dec. 1, 1989

[30] Foreign Application Priority Data

Dec. 5, 1988 [JP] Japan ................... 63-306100

[51] Int. Cl.$^5$ ................ C08F 220/06; C08F 8/48
[52] U.S. Cl. .................... 526/309; 526/308; 526/318.44; 526/937; 528/501
[58] Field of Search ............ 526/309, 271, 272, 937, 526/318.44, 308; 528/503, 501

[56] References Cited

U.S. PATENT DOCUMENTS

| | | | |
|---|---|---|---|
| 4,742,123 | 5/1988 | Kopchik | 525/329.7 |
| 4,789,709 | 12/1988 | Kato et al. | 525/366 |

FOREIGN PATENT DOCUMENTS

| | | | |
|---|---|---|---|
| 0273397 | 7/1988 | European Pat. Off. | |
| 63017953 | 7/1986 | Japan | |
| 63-017915 | 1/1988 | Japan | 526/308 |
| 63-264613 | 11/1988 | Japan | 526/272 |

OTHER PUBLICATIONS

37-Plastic Manuf., vol. 100, 1984, p. 157567w (JP-217501).

*Primary Examiner*—Fred Teskin
*Attorney, Agent, or Firm*—Birch, Stewart, Kolasch & Birch

[57] ABSTRACT

Optical materials having well balanced properties such as high heat resistance, low hygroscopicity and low double refractivity. The optical materials are derived from a low hygroscopic, random copolymer comprising units of methacrylic acid and ester derivatives, and units of a six-membered ring acid anhydride.

7 Claims, 2 Drawing Sheets

LOW-HYGROSCOPIC COPOLYMER

BACKGROUND OF THE INVENTION

1. Field of the Invention

The present invention relates to copolymers which are suitable as materials for optical devices such as plastic lenses and prisms and for substrates or base plates of optical information recording media such as video disks, compact disks, and computer information storage disks. More particularly, the invention relates to copolymers which have high transparency, high heat resistance, low hygroscopicity, good moldability, and low double refractivity, i.e., low indexes of birefringence. These copolymers are used chiefly through injection molding or extrusion.

2. Description of Related Art

Transparent resins are used as materials for optical purposes. In recent years, Fresnel lenses, aspherical lenses, optical disks, etc., made of transparent resins have drawn attention and hence various copolymers have been studied as materials for the manufacture of the optical devices cited above.

Resins which are commercially available and are used today as materials for optical purposes, include polycarbonate and polymethyl methacrylate resins. Polymethyl methacrylate resins, although used because of their high transparency, excellent weather resistance, and low double refractivity, have drawbacks in that the hygroscopicity of these resins is high and upon moisture absorption, they are likely to undergo dimensional changes or deformations such as warps, and in that the heat resistance of these resins is not very high. Hence high temperatures, considerably lower the mechanical strength of these resins and cause their deformations, such as warps.

Polycarbonate resins, although used in view of their low hygroscopicity and high heat resistance, have the drawbacks of poor moldability and high double refractivity. Therefore both types of resins are largely restricted in their applications.

Japanese Patent Application Kokai Nos. Sho 57-33446, Sho. 57-162135, and Sho. 57-108012 propose copolymerization of methyl methacrylate with aromatic vinyl monomers including styrene for the purpose of reducing the high hygroscopicity of polymethyl methacrylate resins. However, when the hygroscopicity is sufficiently reduced by the copolymerization with an aromatic vinyl monomer such as styrene, a further increase in the content of the aromatic vinyl monomer would result in a highly birefringent copolymer, which cannot be used as a material for optical purposes. In addition, such copolymers have lower heat resistance, and hence would be unsuitable in applications in which it is necessary for the material to have similar or higher heat resistance than that of polymethyl methacrylate resins.

Japanese Patent Application Kokai Nos. Sho. 57-186241, Sho. 58-127754, Sho. 58-154751, Sho. 59-1518, and Sho. 60-10410 propose copolymerization of methyl methacrylate with cyclohexyl methacrylate for the purpose of reducing the high hygroscopicity of polymethyl methacrylate resins without increasing their double refractivity. However, when the hygroscopicity is sufficiently reduced by the copolymerization with cyclohexyl methacrylate, a further increase in the content of the cyclohexyl methacrylate would markedly lower the heat resistance and heat stability of the copolymer and render it to be a very brittle copolymer. Hence this copolymerization is problematic in terms of practical applications.

Japanese Patent Application Kokai Nos. Sho. 63-17915 and Hei. 1-178811 (corresponding to U.S. Ser. No. 07/246,823 filed on July 26, 1988 now abandoned) propose copolymers of methyl methacrylate with 4-t-butylcyclohexyl methacrylate, such as 4-t-butylcyclohexyl methacrylate, in an attempt to correct the drawbacks of the methyl methacrylate-cyclohexyl methacrylate copolymer. These copolymers containing t-butylcyclohexyl methacrylate, although being improved in heat resistance over the copolymer containing cyclohexyl methacrylate, have only corrected the drawbacks to a limited extent.

Japanese Patent Application Kokai Nos. Sho. 59-227909 and Sho. 60-115605 propose copolymerization of methyl methacrylate with isobornyl methacrylate or fenchyl methacrylate for the purpose of reducing the hygroscopicity and improving the heat resistance of the respective copolymers formed. However, when isobornyl methacrylate or fenchyl methacrylate is copolymerized with methyl methacrylate, the heat resistance of the copolymer formed is not improved to any great extent and in addition, the mechanical strength as well as the heat stability thereof is also greatly lowered. This would lead to the problem during the melting and molding of the copolymer, in that it would tend to decompose and foam or undergo notable coloration.

On the other hand, U.S. Pat. No. 4,742,123 proposes a thermoplastic, non-cross-linked copolymer having six-membered ring acid anhydride units represented by the formula

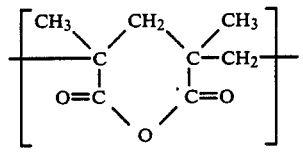

and a Vicat softening temperature of 50° to 175° C. and also being characterized with good heat stability and a copolymer of said six-membered ring acid anhydride with cyclohexyl methacrylate.

Copolymers containing such a six-membered ring acid anhydride units are improved in heat resistance when the content of the anhydride units is high. However the hygroscopicity of these copolymers becomes higher as the anhydride unit content is increased. Hence these copolymers are not adaptable for applications where it is necessary for the material to have high heat resistance and low hygroscopicity.

Further, Japanese Patent Application Kokai No. Sho. 61-49325 (which was filed by the present applicant) proposes a copolymer comprising units of methyl methacrylate, aromatic vinyl, methacrylic acid, and six-membered ring acid anhydride. Japanese Patent Application Kokai No. Sho. 63-264613 discloses that this copolymer can be used for substrates in optical devices such as disks. Further, although this copolymer is characterized with satisfactory heat resistance and low hygroscopicity properties, it cannot be used in cases wherein the copolymer used would also be required to have a low double refractivity.

As stated above, presently, no resin has been found that satisfies performance requirements on the whole.

SUMMARY OF THE INVENTION

In view of these circumstances, the present inventors have made studies in order to develop an optical material which is well balanced in properties such as high heat resistance, low hygroscopicity, and low double refractivity. As a result it has been found that a copolymer having six-membered ring acid anhydride units and methacrylate units represented by following formula [I] is a low hygroscopic material having high heat resistance and low double refractivity, which finding is not predictable from the prior art. Based on this finding, the present invention has been accomplished. Formula [I] is represented as follows:

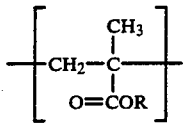   [I]

In this formula, R denotes an alicyclic hydrocarbon radical of 6-20 carbon atoms.

Accordingly, it is an object of the present invention to provide a colorless, transparent copolymer which is superior in heat resistance, has low hygroscopicity and good moldability, which when subjected to injection molding or extrusion molding, would result in products which have low double refractivity.

DETAILED DESCRIPTION OF PREFERRED EMBODIMENTS

Figure 1:
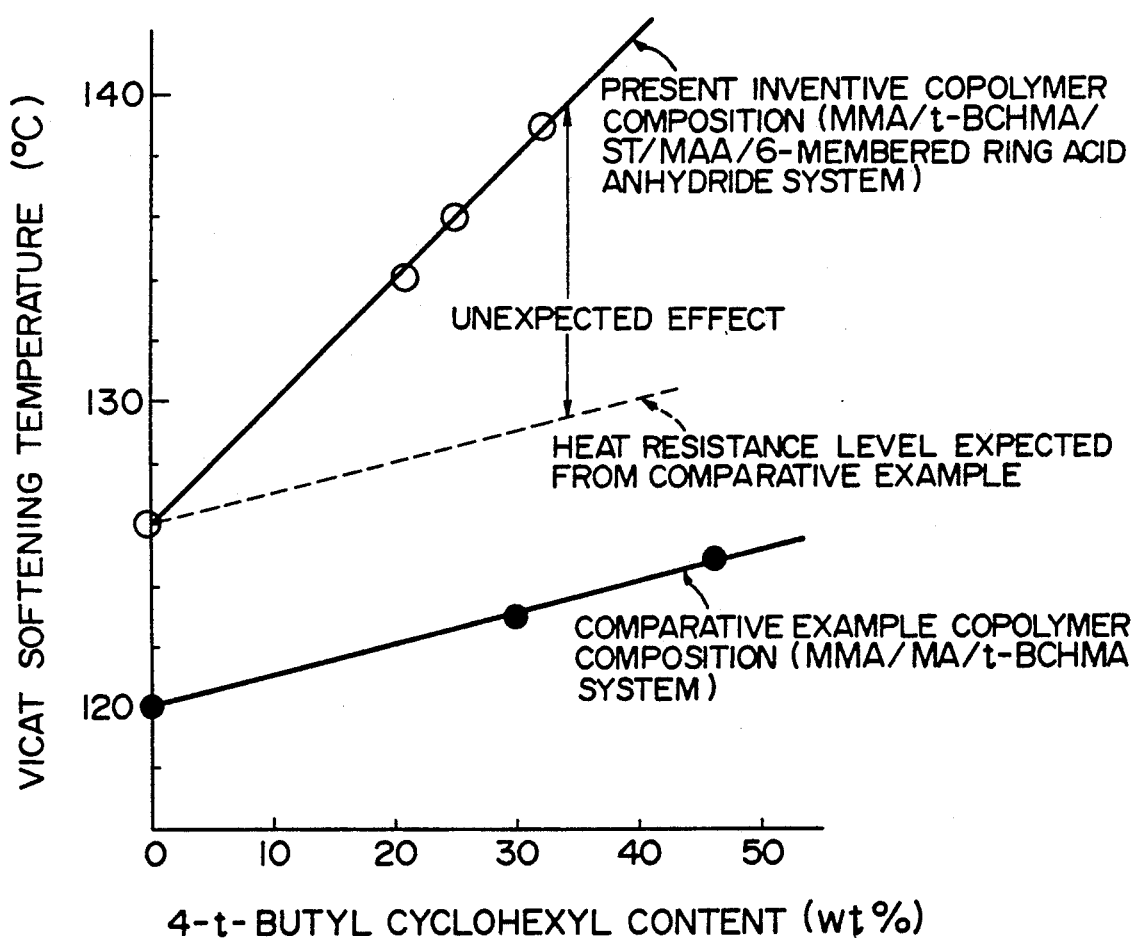
FIG. 1 shows the relationship between the 4-t-butyl-cyclohexyl content (wt %) and Vicat softening temperature (° C.)

The present invention involves a low hygroscopic, random copolymer comprising:
(A) methyl methacrylate units,
(B) methacrylate units represented by the formula

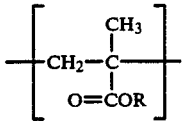

wherein R denotes an alicyclic hydrocarbon radical of 6-20 carbon atoms,
(C) aromatic vinyl units,
(D) methacrylic acid units and
(E) six-membered ring acid anhydride units represented by the formula

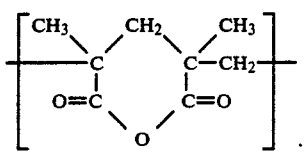

Said copolymer being characterized in that the contents of units (A), (B), (C), (D), and (E), are represented by a, b, c, d, and e % by weight, respectively, and satisfying the conditions:

$93.9 \geq a \geq 25$, $49 \geq b \geq 5$, $30 \geq c \geq 0$, $20 \geq d \geq 0.1$, $40 \geq e \geq 1$, $98.9 \geq a+b \geq 50$, $98.9 \geq a+b+c \geq 60$ and $a+b+c+d+e = 100$ and that a chloroform solution of the copolymer in a concentration of 0.15 g/0.5 dl has a reduced viscosity of 0.2-1.0 dl/g at 25° C.

In the copolymer of the present invention, the total content of (A) methyl methacrylate units, (B) methacrylate units, and (C) aromatic vinyl units are required to be 60-98.9% by weight and is preferably 60-94.9% by weight. When this content is too low, the melt flow properties of the copolymer are inferior and its moldability and processability are unsatisfactory. When this content is too high the heat resistance of the copolymer is improved only to a limited extent.

The total content of (A) methyl methacrylate units and (B) methacrylate units is required to be 50-98.9% by weight and is preferably 50-94.9% by weight. When this content is too low, the double refractivity is not lowered. When this content is too high, the heat resistance of the copolymer, is improved only to a limited extent.

The content of (A) methyl methacrylate units in the copolymer is required to be 25-93.9% by weight and is preferably 25-84.9% by weight. When this content is too low, the mechanical strength is insufficient. When this content is too high, the heat resistance of the copolymer is improved only to a limited extent and hygroscopicity is not sufficiently reduced.

Examples of (B) methacrylate units are represented by the formula

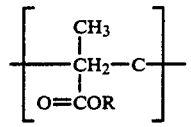

wherein R is an alicyclic hydrocarbon radical of 6-20 carbon atoms, which includes units of cyclohexyl methacrylate, alkylcyclohexyl methacrylate, alkenylcyclohexyl methacrylate, bornyl methacrylate, fenchyl methacrylate, 1-menthyl methacrylate, adamantyl methacrylate, and dimethyladamantyl methacrylate. The methacrylate having an alicyclic hydrocarbon radical of the greater steric hindrance is the more desirable in view of the heat resistance of the copolymer. Accordingly, preferred methacrylates have alicyclic hydrocarbon radicals of 7-20 carbon atoms. Of such methacrylates, particularly preferred are alkyl($C_1$-$C_{14}$)cyclohexyl methacrylates and alkenyl($C_1$-$C_{14}$)cyclohexyl methacrylates. The most desirable of these monomers is t-butylcyclohexyl methacrylate.

The content of methacrylate units is required to be 5–49% by weight and is preferably 10–49% by weight. When this content is too low, the hygroscopicity is not sufficiently reduced. When this content is too high the copolymer is characterized with inferior mechanical strength.

Examples of (C) aromatic vinyl units include styrene, α-methylstyrene, vinyltoluene, dimethylstyrene, and t-butylstyrene units. Of these monomers, preferred are styrene and α-methylstyrene, which may be used alone or in combination.

The aromatic vinyl units have the effect of providing a copolymer with lowered hygroscopicity. The content of aromatic vinyl units is up to 30%, preferably up to 20%, by weight. The copolymer, when containing excessive styrene, provides moldings having high optical anisotropy such as high double refractivity and when containing excessive α-methylstyrene, the copolymer is characterized with problems such as having low mechanical strength.

Methacrylic acid units of (D) are necessary to produce six-membered ring acid anhydride units, which in turn, characterizes a copolymer with an improvement in heat resistance. The content of the methacrylic acid is 0.1–20%, preferably 0.1–10%, by weight. When this content is too high, the heat stability of the copolymer is insufficient. On the other hand, not all of the methacrylic acid units are capable of being converted to six-membered ring acid anhydride units because some of these units, as arranged in the polymer chains, are unfavorable to this conversion, and thus, some of the methacrylic acid units will remain in the copolymer.

The six-membered ring acid anhydride units of (E), which are derived from methacrylic acid units, characterizes a copolymer with improved heat stability by means of completely eliminating the thermally unstable factors which the methacrylic acid provided. The content of six-membered ring acid anhydride units is 1–40%, preferably 5–40%, by weight. When this content is too low, the heat resistance or heat stability is not improved. When this content is too high, the copolymer exhibits inferior melt flow properties and hence worsens moldability and processability.

The reduced viscosity of a chloroform solution of the copolymer of the present invention in a concentration of 0.15 g /0.5 dl, as a measure of the molecular weight of the copolymer, is required to be in the range of 0.2 to 1.0 dl/g at 25° C. When said viscosity is less than 0.2 dl/g, the mechanical strength of such a copolymer is undesirably low and when said viscosity exceeds 1.0 dl/g, the copolymer has inferior melt flow properties, and hence its moldability and processability become unsatisfactory.

The copolymer of the present invention can be produced by common radical polymerization methods such as bulk polymerization, solution polymerization, suspension polymerization, and emulsion polymerization. In the suspension polymerization and the emulsion polymerization, however, a certain monomer used dissolves in the aqueous phase, which occasionally, produces adverse effects on the rate of polymerization or on the stability of the polymerization system. Hence, the bulk polymerization and the solution polymerization are preferable and moreover it is desirable to use a perfect mixing type of polymerization reactor for the purpose of uniformly mixing the composition of the copolymer as far as possible to provide a copolymer which is superior in appearance and mechanical properties.

A radical polymerization initiator together with a chain transfer agent for molecular weight control can be used in the polymerization to produce the copolymer of the present invention. Examples of the radical polymerization initiator include azo compounds and organic peroxides such as peroxyesters, peroxyketals, and dialkyl peroxides and examples of the chain transfer agent include n-butylmercaptan, n-octyl-mercaptan, and n-dodecylmercaptan.

As the occasion demands, the copolymer of the present invention may be blended with other resins and may contain common additives selected from antioxidants, ultraviolet absorbers, colorants, mold-release agents, etc.

Since a large amount of volatile matter, if contained in the copolymer of the present invention, impairs the heat resistance and heat stability, which are two characteristic features of the copolymer. Thus, the content of volatile matter contained in the copolymer is desirably present in an amount of no more than 1.5%, preferably 1.0%, by weight.

Contents of units of (A)–(E) constituting the copolymer can be determined by the following methods: contents of (A)–(C) units are each determined by $^{13}$C-NMR spectroscopic analysis, the content of (D) units by neutralizing titration (alkalimetry) of the polymer, and the content of (E) units by infrared absorption spectroscopy.

The present copolymer retains the colorless transparency and weather resistance characteristic of methyl methacrylate resins, has superior heat resistance and heat stability and low hygroscopicity. Molded articles of the copolymer are markedly improved in dimensional stability to heat and moisture and in resistance to warping. Hence the copolymer in the form of sheets or molding compounds can be used for various applications, particularly optical devices such as plastic lenses and prisms and substrates of optical recording media such as video disks, compact disks, and computer information storage disks.

The following examples illustrate the present invention in more detail without placing any restriction on the scope of the invention.

The physical properties of the copolymers, in the examples, are measured by the following methods.

(1) Vicat softening temperature: ASTM-D1525

(2) Tensile strength: ASTM-D638

(3) Melt flow rate (MFR): ASTM-D1238, 230° C., 3.8 Kg load (4) Total luminous transmittance and haze: ASTM-D1003

(5) Saturated water absorption: ASTM-D570

(6) Reduced viscosity: Chloroform solution of 0.15 g/ 0.5 dl concentration at 25° C.

(7) Double refractivity: By using an ellipsometer (single pass)

EXAMPLE 1

A mixture of 58 wt % methyl methacrylate, 19 wt % of 4-t-butylcyclohexyl methacrylate, 5 wt % of styrene, 8 wt % of methacrylic acid, 10 wt % of ethylbenzene, 0.005 wt % of 1,1-di-t-butylperoxy-3,3,5-trimethylcyclohexane, and 0.05 wt % of n-octylmercaptan is fed continuously at a rate of 1 l/hr into a 2-l, jacketed, perfect-mixing type of reactor, wherein said monomers are polymerized at 125° C. The resulting reaction fluid containing 40 wt % solids is fed continuously into a high-temperature, vacuum chamber, wherein six-membered ring acid anhydride units were produced and unreacted materials are removed simultaneously. Neutralizing titration and analyses by using an infrared spectrophotometer and an NMR spectrometer revealed that the obtained copolymer is constituted of 63 wt % of methyl methacrylate, 21 wt % of p-t-butyl-cyclohexyl methacrylate, 7 wt % of styrene, 1 wt % of methacrylic acid, and 8 wt % of the six-membered ring acid anhydride.

The composition and physical properties of the obtained copolymer are shown in Table 2. Measurement of the double refractivity is made on a one-side pitted base plate (a disk of 360 mm diameter and 1.2 mm thickness made from the copolymer by injection molding at a cylinder temperature of 260° C.) at a porition 50 mm distant from the disk center.

EXAMPLES 2 AND 3

In the same manner as in Example 1, solutions having compositions shown in Table 2 are subjected to polymerization and then to post treatment. Compositions and physical properties of the obtained copolymers are shown in Table 2.

COMPARATIVE EXAMPLES –5

In the same manner as in Example 1, copolymers were obtained from solutions having compositions shown in Table 1. Compositions and physical properties of these copolymers are shown in Table 2.

Figure 2:
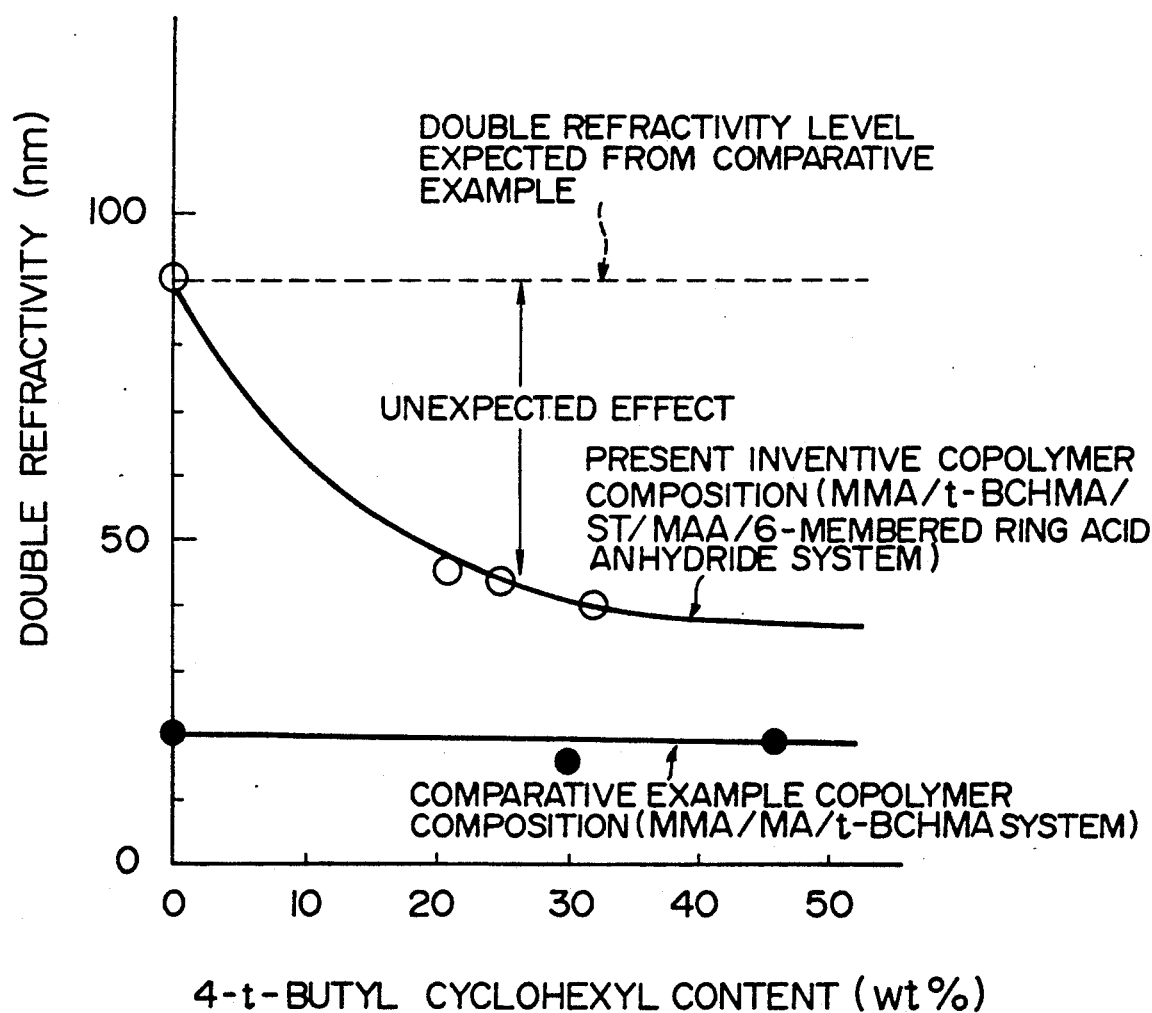
FIG. 2 shows the relationship between the 4-t-butyl-cyclohexyl content (wt %) and double refractivity.

From results of Examples 1-3 and Comparative Examples 1-4, changes of the Vicat softening temperature and double refractivity with the content of 4-t-butylcyclohexyl methacrylate units are determined on the obtained copolymers to demonstrate the effects of six-membered ring acid anhydride units and of methacrylic acid units on the above properties. Said found changes are shown in FIGS. 1 and 2. It is evident from FIGS. 1 and 2 that the copolymer of the present invention, containing six-membered ring acid anhydride units and methacrylic acid units, has unexpectedly-favorable properties such as higher heat resistance and lower double refractivity than those of copolymers having neither of the units of the two monomers.

COMPARATIVE EXAMPLE 6

Procedures are carried out similar to those of Example 1 except that a polymerized reaction fluid is deaerated at a low temperature without being introduced into a high-temperature vacuum chamber and volatile components are removed. The result of a component analysis of the copolymer is as follows:

| | |
|---|---|
| methyl methacrylatae | 65 wt % |
| 4-tert-butylcyclohexyl methacrylate | 23 wt % |
| styrene | 6 wt % |
| methacrylic acid | 6 wt % and |
| a volatile content | 0.3 wt % |

After the copolymer is thoroughly dried, it is injectmolded, silver marks are observed on the resulting molded item. Thus, good molded products could not be obtained using this copolymer.

TABLE 1

| Composition of fed polymerization solution (wt % of ingredient) | Example 1 | Example 2 | Example 3 | Compar. Example 1 | Compar. Example 2 | Compar. Example 3 | Compar. Example 4 | Compar. Example 5 |
|---|---|---|---|---|---|---|---|---|
| Methyl methacrylate | 58 | 52 | 47 | 83 | 61 | 48 | 88 | 29 |
| Methyl acrylate | 0 | 0 | 0 | 0 | 2 | 1 | 2 | 0 |
| 4-t-Butyl-cyclohexyl methacrylate | 19 | 25 | 30 | 0 | 14 | 41 | 0 | 9 |
| Styrene | 5 | 5 | 5 | 5 | 0 | 0 | 0 | 44 |
| Methacrylic acid | 8 | 8 | 8 | 8 | 0 | 0 | 0 | 3 |
| Ethylbenzene | 10 | 10 | 10 | 10 | 10 | 10 | 10 | 15 |
| Initiator* | 0.005 | 0.005 | 0.005 | 0.005 | 0.005 | 0.005 | 0.015 | 0.005 |
| n-Octyl-mercaptan | 0.05 | 0.05 | 0.05 | 0.05 | 0.05 | 0.05 | 0.05 | 0.05 |

*1,1-Di-t-butylperoxy-3,3,5-trimethylcyclohexane

TABLE 2

| | Example 1 | Example 2 | Example 3 | Compar. Example 1 | Compar. Example 2 | Compar. Example 3 | Compar. Example 4 | Compar. Example 5 |
|---|---|---|---|---|---|---|---|---|
| Composition of copolymer (wt % of constituent) | | | | | | | | |
| Methyl methacrylate | 63 | 59 | 53 | 83 | 68 | 53 | 98 | 47 |
| Methyl acrylate | 0 | 0 | 0 | 0 | 2 | 1 | 2 | 0 |
| 4-t-Butyl-cyclohexyl methacrylate | 21 | 25 | 32 | 0 | 30 | 46 | 0 | 6 |
| Styrene | 7 | 7 | ·7 | 7 | 0 | 0 | 0 | 40 |
| Methacrylic acid | 1 | 1 | 1 | 1 | 0 | 0 | 0 | 1 |
| Six-membered ring acid anhydride | 8 | 8 | 9 | 9 | 0 | 0 | 0 | 6 |
| Vicat softening | 134 | 136 | 139 | 126 | 123 | 125 | 120 | 125 |

TABLE 2-continued

|  | Example 1 | Example 2 | Example 3 | Compar. Example 1 | Compar. Example 2 | Compar. Example 3 | Compar. Example 4 | Compar. Example 5 |
|---|---|---|---|---|---|---|---|---|
| temperature (°C.) | | | | | | | | |
| Tensile strength (kgf/cm$^2$) | 750 | 740 | 720 | 800 | 655 | 500 | 770 | 760 |
| Total luminous transmittance (%) | 93 | 92 | 92 | 92 | 93 | 92 | 92 | 92 |
| Haze (%) | 0.5 | 0.6 | 0.6 | 0.6 | 0.6 | 0.6 | 0.6 | 0.6 |
| Reduced viscosity (dl/g) | 0.50 | 0.51 | 0.50 | 0.50 | 0.50 | 0.51 | 0.51 | 0.50 |
| MFR (g/10 min) | 1.0 | 0.9 | 0.9 | 0.9 | 0.9 | 1.1 | 1.5 | 1.8 |
| Saturated water absorption (%) | 1.3 | 1.0 | 0.9 | 1.8 | 1.0 | 0.6 | 2.1 | 0.9 |
| Double refractivity (mm) | 45 | 43 | 40 | 90 | 16 | 19 | 20 | 250 |

EXAMPLE 4-7

In the same manner as in Example 1, solutions having compositions shown in Table 3 are each fed at a rate of 0.5 ℓ/hr into the same reactor as used in Example 1, wherein the fed monomers are copolymerized, and the resulting polymer solutions are subjected to post treatment. Compositions and physical properties of the obtained copolymers are shown in Table 4.

COMPARATIVE EXAMPLE 7

In the same manner as in Example 4, a solution of composition shown in Table 3 is subjected to copolymerization and the resulting polymer solution is post-treated. Composition and physical properties of the obtained copolymer are shown in Table 4. As shown in this table, the copolymer is found to have low heat resistance and high water absorption.

COMPARATIVE EXAMPLE 8

In the same manner as in Example 4, a solution of composition shown in Table 3 is subjected to copolymerization and the resulting polymer solution is post-treated. Composition and physical properties of the obtained copolymer are shown in Table 4. As shown in this table, the copolymer is found to have low mechanical strength.

TABLE 3

| Composition of fed polymerization solution (wt % of ingredient) | Example 4 | Example 5 | Example 6 | Example 7 | Compar. Example 7 | Compar. Example 8 |
|---|---|---|---|---|---|---|
| Methyl methacrylate | 53 | 44 | 50 | 38 | 81 | 15 |
| 4-t-Butyl-cyclohexyl methacrylate | 24 | 33 | 11 | 23 | 0 | 62 |
| α-Methyl-styrene | 14 | 14 | 24 | 24 | 15 | 14 |
| Methacrylic acid | 4 | 4 | 10 | 10 | 4 | 4 |
| Ethylbenzene | 5 | 5 | 5 | 5 | 5 | 5 |
| Initiator* | 0.025 | 0.025 | 0.025 | 0.025 | 0.025 | 0.025 |
| n-Octyl-mercaptan | 0.01 | 0.01 | 0.01 | 0.01 | 0.01 | 0.01 |

*1,1-di-t-Butylperoxy-3,3,5-trimethylcyclohexane merization and the resulting polymer solution is post-

TABLE 4

|  | Example 4 | Example 5 | Example 6 | Example 7 | Compar. Example 7 | Compar. Example 8 |
|---|---|---|---|---|---|---|
| Composition of copolymer (wt % of constituent) | | | | | | |
| Methyl methacrylate | 69 | 56 | 57 | 50 | 85 | 26 |
| 4-t-Butyl-cyclohexyl methacrylate | 17 | 30 | 8 | 15 | 0 | 68 |
| α-Methyl-styrene | 8 | 8 | 16 | 16 | 8 | 8 |
| Methacrylic acid | 3 | 3 | 2 | 2 | 2 | 3 |
| Six-membered ring acid anhydride | 3 | 3 | 17 | 18 | 5 | 3 |
| Vicat softening temperature (°C.) | 145 | 148 | 150 | 153 | 138 | 156 |
| Tensile strength (kgf/cm$^2$) | 750 | 710 | 720 | 690 | 790 | 350 |
| Total luminous transmittance (%) | 93 | 92 | 92 | 92 | 93 | 92 |

TABLE 4-continued

|  | Example 4 | Example 5 | Example 6 | Example 7 | Compar. Example 7 | Compar. Example 8 |
|---|---|---|---|---|---|---|
| Haze (%) | 0.5 | 0.5 | 0.6 | 0.6 | 0.5 | 0.5 |
| Reduced viscosity (dl/g) | 0.51 | 0.54 | 0.52 | 0.53 | 0.50 | 0.50 |
| MFR (g/10 minutes) | 0.8 | 0.6 | 0.7 | 0.6 | 0.9 | 1.0 |
| Saturated water absorption (%) | 1.3 | 1.0 | 1.2 | 0.9 | 2.2 | 0.4 |

EXAMPLES 8-10

In the same manner as in Example 1, solutions having compositions shown in Table 5 are subjected seperately to copolymerization and the resulting polymer solutions are post-treated. Compositions and physical properties of the obtained copolymers are shown in Table 6.

COMPARATIVE EXAMPLE 9

In the same manner as in Example 1, a solution of composition shown in Table 5 is subjected to copolymerization and the resulting polymer solution is post-treated. Composition and physical properties of the obtained copolymer are shown in Table 6. As shown in the table, this copolymer contained no six-membered ring acid anhydride and the content of volatile matter in the copolymer is 0.4 wt %. Injection molding of this copolymer, after thoroughly drying the copolymer, gives moldings having silver marks on the whole surface. Thus, good moldings could not be obtained using this copolymer.

TABLE 5

| Composition of fed polymerization solution (wt % of ingredient) | Example 8 | Example 9 | Example 10 | Compar. Example 9 |
|---|---|---|---|---|
| Methyl methacrylate | 48 | 44 | 48 | 52 |
| 4-t-Butylcyclohexyl methacrylate | 28 | 28 | — | — |
| 4-Isopropylcyclohexyl methacrylate | — | — | 28 | — |
| Isobornyl methacrylate | — | — | — | 28 |
| Methacrylic acid | 4 | 8 | 4 | 0 |
| Ethylbenzene | 20 | 20 | 20 | 20 |
| Initiator* | 0.01 | 0.01 | 0.01 | 0.01 |
| n-Octylmercaptan | 0.15 | 0.15 | 0.15 | 0.15 |

*1,1-Di-t-butylperoxy-3,3,5-trimethylcyclohexane

TABLE 6

|  | Example 8 | Example 9 | Example 10 | Compar. Example 9 |
|---|---|---|---|---|
| Composition of copolymer (wt % of constituent) | | | | |
| Methyl methacrylate | 63 | 55 | 63 | 69 |
| 4-t-Butylcyclohexyl methacrylate | 30 | 32 | — | — |
| 4-Isopropylcyclohexyl methacrylate | — | — | 30 | — |
| Isobornyl methacrylate | — | — | — | 31 |
| Methacrylic acid | 2 | 3 | 2 | 0 |
| Six-membered ring acid anhydride | 5 | 10 | 5 | 0 |
| Vicat softening temperature (°C.) | 139 | 141 | 138 | 128 |
| Tensile strength (kgf/cm²) | 700 | 730 | 710 | 650 |
| Total luminous | 92 | 92 | 92 | 93 |
| Haze (%) | 0.5 | 0.6 | 0.5 | 0.4 |
| Reduced viscosity (dl/g) | 0.56 | 0.52 | 0.58 | 0.54 |
| MFR (g/10 min.) | 0.8 | 0.8 | 0.9 | 1.6 |
| Saturated water absorption (%) | 1.3 | 1.5 | 1.4 | 1.3 |

What is claimed is:

1. A low hygroscopic, random copolymer comprising:
   (A) methyl methacrylate units,
   (B) methacrylate units represented by the formula

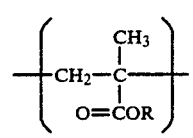

[I]

wherein R denotes an alicyclic hydrocarbon radical of 6-20 carbon atoms,
   (C) aromatic vinyl units,
   (D) methacrylic acid units and (E) six-membered ring acid anhydride units represented by the formula

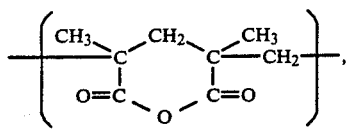

said copolymer being characterized in that the contents of units (A), (B), (C), (D), and (E), are represented by a, b, c, d, and e % by weight, respectively, and satisfying the conditions:

$93.9 > a \geq 25$, $49 \geq b \geq 5$, $30 \geq c \geq 0$, $20 \geq d \geq 0.1$, $40 \geq e \geq 1$, $98.9 \geq a+b \geq 50$, $98.0 \geq a+b+c \geq 60$ and $a+b+c+d+e = 100$ and that a chloroform solution of the copolymer in a concentration of 0.15 g/0.5 dl has a reduced viscosity of 0.2–1.0 dl/g at 25° C.

2. The low hygroscopic, random copolymer of claim 1, wherein the conditions are:

$84.9 \geq a \geq 25$, $49 \geq b \geq 10$, $20 \geq c \geq 0$, $10 \geq d \geq 0.1$, $40 \geq e \geq 5$, $94.9 \geq a+b \geq 50$, $94.9 \geq a+b+c \geq 60$ and $a+b+c+d+e=100$.

3. The low hygroscopic, random copolymer of claim 1, wherein the R of methacrylate unit (B) represented by formula [1] is an alicyclic hydrocarbon radical of 7–20 carbon atoms.

4. The low hygroscopic, random copolymer of claim 3, wherein the R of methacrylate unit (B) represented by formula [1] is an alkylcyclohexyl or alkenylcyclohexyl radical.

5. The low hygroscopic, random copolymer of claim 4, wherein the R of methacrylate unit (B) represented by formula [1] is a t-butylcyclohexyl radical.

6. The low hygroscopic, random copolymer of claim 1, wherein methacrylate units (B) represented by formula [1] are each units of cyclohexyl methacrylate, alkylcyclohexyl methacrylate, alkenylcyclohexyl methacrylate, bornyl methacrylate, fenchyl methacrylate, l-menthyl methacrylate, adamantyl methacrylate or dimethyladamantyl methacrylate.

7. The low hygroscopic, random copolymer of claim 1, wherein aromatic vinyl units (C) are each units of styrene, α-methylstyrene, vinyltoluene, dimethylstyrene or t-butylstyrene.

* * * * *